(12) United States Patent
Biswas et al.

(10) Patent No.: US 12,354,011 B2
(45) Date of Patent: Jul. 8, 2025

(54) DATA AUGMENTATION USING MACHINE TRANSLATION CAPABILITIES OF LANGUAGE MODELS

(71) Applicant: VERIZON PATENT AND LICENSING INC., Basking Ridge, NJ (US)

(72) Inventors: Subham Biswas, Maharashtra (IN); Saurabh Tahiliani, Uttar Pradesh (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 973 days.

(21) Appl. No.: 17/399,431

(22) Filed: Aug. 11, 2021

(65) Prior Publication Data

US 2023/0050134 A1   Feb. 16, 2023

(51) Int. Cl.
*G06N 20/00* (2019.01)
*G06N 3/044* (2023.01)
*G06N 3/045* (2023.01)
*G06N 3/084* (2023.01)

(52) U.S. Cl.
CPC .......... *G06N 3/084* (2013.01); *G06N 3/044* (2023.01); *G06N 3/045* (2023.01); *G06N 20/00* (2019.01)

(58) Field of Classification Search
None
See application file for complete search history.

(56) References Cited

U.S. PATENT DOCUMENTS

| | | | |
|---|---|---|---|
| 2018/0203852 A1* | 7/2018 | Goyal | G06F 40/56 |
| 2020/0050662 A1* | 2/2020 | Bhat | G06F 18/211 |
| 2020/0402625 A1* | 12/2020 | Aravamudan | G16H 10/60 |
| 2021/0065018 A1* | 3/2021 | Podgorny | G06Q 30/01 |
| 2021/0279577 A1* | 9/2021 | West | G06N 3/045 |
| 2021/0397610 A1* | 12/2021 | Singh | G06N 7/01 |
| 2023/0255553 A1* | 8/2023 | Weston | A61B 5/7264 |
| | | | 600/586 |

FOREIGN PATENT DOCUMENTS

CN     112598039 A  *  4/2021   ............. G06F 18/22

* cited by examiner

*Primary Examiner* — Xuyang Xia

(57) ABSTRACT

Disclosed are embodiments for improving training data for machine learning (ML) models. In an embodiment, a method is disclosed where an augmentation engine receives a seed example, the seed example stored in a seed training data set; generates an encoded seed example of the seed example using an encoder; inputs the encoded seed example into a machine learning model and receives a candidate example generated by the machine learning model; determines that the candidate example is similar to the encoded seed example; and augments the seed training data set with the candidate example.

16 Claims, 5 Drawing Sheets

DATA AUGMENTATION USING MACHINE TRANSLATION CAPABILITIES OF LANGUAGE MODELS

BACKGROUND INFORMATION

Many machine learning (ML) models require labeled examples to tune the parameters used during production. For example, text-based models generally require a set of labeled sentences or phrases to tune the parameters. In general, the more labeled training data used, the more accurate the tuning of the model parameters.

DETAILED DESCRIPTION

Figure 1:
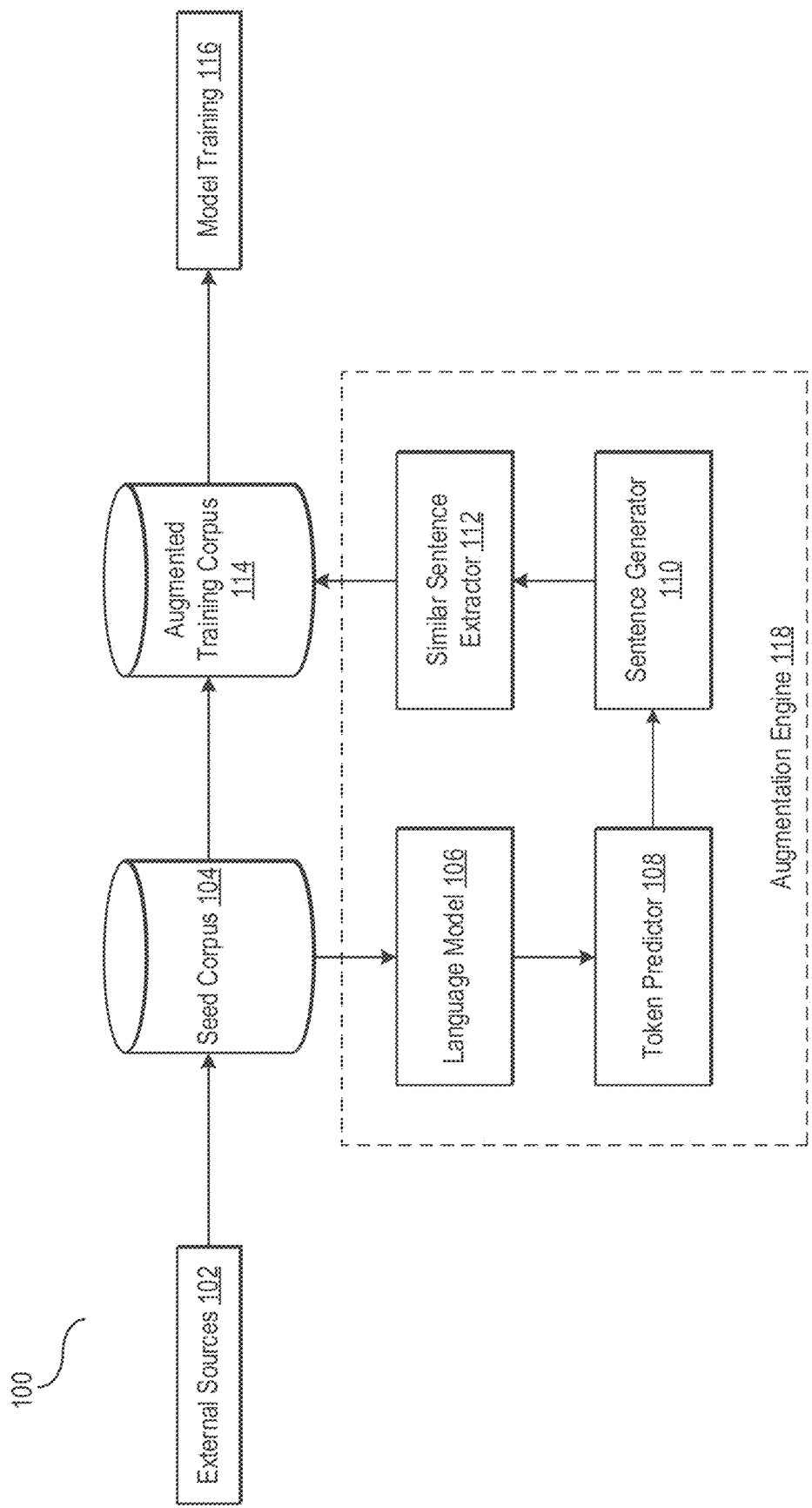
FIG. 1 is a block diagram of a system for generating an augmented training dataset according to some embodiments.

The example embodiments describe techniques for improving training data used to train ML models. Current systems require a large amount of labeled data to train an ML model so that it performs accurately. Most current approaches rely on manual labeling of training data by human annotators, but such approaches require significant time to implement and resources to implement, which may not always be available. Additionally, human biases often negatively impact the manually applied labels, and human error (i.e., mislabeling) can negatively impact the model training and the model itself, ultimately. Some systems attempt to remedy these problems with automatic labeling using, for example, regular expressions or other pattern matching techniques. However, human biases can also influence the underlying rules, and thus annotators impute such biases into the process even during automatic labeling. Further, such approaches cannot account for the syntactic and semantic nuances of text-based examples.

The example embodiments solve these and other problems in processing training data. The example embodiments increase the speed of development of ML models, reduce manual labeling, retain semantic and syntactic context, maintain the integrity of seed data, and are model and language agnostic.

The example embodiments utilize an ML language model to predict tokens similar to a seed example recursively tracking the syntactic and semantic relationship of features of the example. The example embodiments combine the tokens to form candidate examples. The example embodiments select similar syntactic and semantic examples from the candidate examples based on relevance and a threshold. The example embodiments then combine these selected examples with the examples in the original dataset to create an augmented training dataset with pseudo-reinforcement learning for the training of the ML model.

In the various embodiments, devices, systems, computer-readable media, and methods are disclosed for improving a training data set. In an embodiment, an augmentation engine receives a seed example from a seed training data set. In some embodiments, the seed example can comprise text data (e.g., a sequence of words or sentences).

The engine can then generate a vector representation of the seed example using an encoder. In some embodiments, the encoder can comprise one or more of a BERT (Bidirectional Encoder Representations from Transformers), RoBERTA (Robustly optimized BERT approach), ELECTRA (Efficiently Learning an Encoder that Classifies Token Replacements Accurately), Generative Pre-Trainer (GPT) variant, or XLNet (Extra Long Net) encoder. In some embodiments, a masked language model (MLM) training objective can be used to train the encoder using a document corpus. In some embodiments, the MLM training objective comprises masking a subset of input tokens based on at least one grammatical rule.

The engine can then input the vector representation into a machine learning model and receives one or more candidate examples generated by the machine learning model. In some embodiments, the engine inputs the vector representation into a recurrent neural network (RNN), Long-Short Term Memory (LSTM), or similar network. In some embodiments, the network can be trained by clustering a data corpus based on vector representations generated by the encoder, inserting a training example from the data corpus into the RNN, LS™ or similar network, and receiving a predicted candidate example, computing a loss between the predicted candidate example and the training example, and back-propagating an error to the RNN based on the loss.

The engine can then determine that the candidate example is similar to the vector representation. Finally, the engine can then augment the seed training data set with the candidate example. Ultimately, the augmented training data can be used to train various types of models (e.g., a logistic regression model, decision tree, random forest, or any other type of ML model).

FIG. 1 is a block diagram of a system for generating an augmented training dataset according to some embodiments.

In an embodiment, a system 100 includes a seed corpus 104 populated with seed examples pulled from an external source 102. The external source 102 can comprise any computing system capable of generating data. For example, external source 102 can comprise a chatbot system, live chat system, or a frequently asked question (FAQ) database. In some embodiments, the external source 102 can provide labeled examples. For example, a live chat system can provide conversations and a corresponding topic generated as part of executing the live chat system. In some embodiments, these examples can be manually labeled or categorized by one party to the chat (e.g., a customer service representative). Similarly, an FAQ database can include a topic manually labeled by human editors. As will be discussed, in some embodiments, the external source 102 can provide only a small number of examples. As used herein, an example refers to any data capable of being used as training data for a machine learning system. Examples can comprise text data, images, video, etc. As used herein, a labeled example refers to an example with an associated label. The label can comprise a categorical label or continuous label. In general, external source 102 can comprise any existing system that generates data in an organization. In some embodiments, a separate process can mine examples from external source 102 and store such examples in seed corpus 104.

In the illustrated embodiment, an augmentation engine 118 is communicatively coupled to the seed corpus 104 and can retrieve or receive the examples stored in seed corpus 104. In an embodiment, the augmentation engine 118 can comprise a physically separate computing device that can communicate with seed corpus 104 over a network. For example, augmentation engine 118 can be implemented as one or more cloud compute (e.g., elastic compute) instances, and seed corpus 104 can be implemented as a network-accessible database or repository. In such an embodiment, the augmentation engine 118 can issue network requests to the seed corpus 104 and retrieve seed examples as needed (and as discussed).

The augmentation engine 118 can retrieve seed examples and generate similar examples. Similar examples comprise examples that are similar to a given seed example. For example, if the seed example is a sentence, a similar example can comprise a sentence that is syntactically or semantically similar (or both) to the seed example. As one example, for the seed example ("I like football"), the example "Football is great" is semantically and syntactically similar. However, the example embodiments are not limited in such a manner. For example, the example "I like cricket" is syntactically similar to the seed example and may also comprise a candidate example. In this particular example, the candidate example can be obtained due to a language model masking the term "football" when training a language model, as discussed further herein. While text-based examples are described primarily, the example embodiments are not limited as such. For example, a seed example can comprise an image, and the candidate example can comprise an automatically generated image similar (e.g., in color, arrangement, etc.) to the seed image. Similar approaches can be applied to video or structured data.

In an embodiment, the augmentation engine 118 outputs similar examples to an augmented training corpus 114. In an embodiment, the augmented training corpus 114 can comprise a storage device similar to seed corpus 104, the details of which are not repeated herein. As illustrated, the augmented training corpus 114 can store both the seed examples from seed corpus 104 and similar examples generated by the augmentation engine 118. In some embodiments, the augmented training corpus 114 can associate each example with a label. In some embodiments, the augmented training corpus 114 can group a seed example from seed corpus 104 with one or more similar examples generated by augmentation engine 118.

In some embodiments, labels may be omitted from the above process. In such an embodiment, similar examples and seed examples can be grouped together without any associated label. In such an approach, labels can be automatically added to all grouped examples by a human editor. Since similar examples are associated with a seed example, a human editor only needs to label the seed example, and the system 100 can automatically apply the label to all similar examples in the group.

In an embodiment, a model training 116 device is communicatively coupled to augmented training corpus 114. The model training 116 can comprise any computing device used to train a predictive model such as a logistic regression model, decision tree or random forest model, neural network, etc. The specific model that the model training 116 trains is not limiting. Indeed, any model that requires labeled or unlabeled examples can be used. In the illustrated embodiment, the model training 116 uses the examples in augmented training corpus 114 to perform training and/or testing of a predictive model. In some embodiments, the model training 116 can perform a first training process using only seed examples from seed corpus 104. The model training 116 can then calculate the accuracy of the trained model via a test process. Next, model training 116 can load the examples from model training 116 and retrain the model, and re-compute the accuracy via a second test process. In some embodiments, the model training 116 can determine if the retraining resulted in an improvement in prediction accuracy. The model training 116 can then repeatedly re-generate similar examples using augmentation engine 118 and retrain the model until the desired accuracy is reached.

In an embodiment, the augmentation engine 118 includes a language model 106. In an embodiment, the language model 106 can comprise an ELECTRA, BERT, RoBERTa, GPT variant, or XLNet model. In an embodiment, the language model 106 can comprise an encoder network. In an embodiment, the encoder network can receive a seed example and convert the input example into a vector representation (e.g., word embedding). In an embodiment, the encoder network can be trained using a masked language model (MLM) that utilizes grammar-based masking rules, as described in more detail in the description of step 302. In an embodiment, the encoder can generate word embeddings for a sequence of features (e.g., words) of an example simultaneously and output a vector representation of an entire seed example.

In an embodiment, the augmentation engine 118 can further include a token predictor 108. In some embodiments, the token predictor 108 can comprise a decoder network (e.g., neural network) that can receive the generated vector representations and output sequences of tokens. In an embodiment, the token predictor 108 outputs tokens to the example generator 110, discussed further herein. In an embodiment, the token predictor 108 can output a sequence of tokens similar to a seed example. In some embodiments, the token predictor 108 can be trained using a set of clustered training examples, where each example in a cluster is similar to the others. In some embodiments, the token predictor 108 can comprise an output layer or decoder network of the language model 106 itself. In other embodiments, the token predictor 108 can comprise a separate neural network or similar model.

In an embodiment, an example generator 110 receives tokens from the token predictor 108. In one embodiment, the token predictor 108 can output tokens in a streaming manner to the example generator 110. In an embodiment, the example generator 110 monitors a token stream received from token predictor 108 and determines if an end of sequence (EOS) token is received. In an embodiment, the EOS token signals that a candidate example can be formed from the tokens generated by the token predictor 108. In some embodiments, example generator 110 can be omitted, and in such an embodiment, the token predictor 108 can output a complete candidate example to similar example extractor 112. In an embodiment, example generator 110 can concatenate tokens received from token predictor 108 to generate a candidate example (i.e., an example that has not yet been confirmed as similar to the seed example).

In some embodiments, language model 106 can be optional or replaced with a different model if the seed examples are not text. In some embodiments, the language model 106 and token predictor 108 can be combined for non-text data. For example, a convolutional neural network (CNN) or generative adversarial network (GAN) can be used to generate similar images or videos when the seed example is image or video, respectively.

In an embodiment, the similar example extractor 112 receives candidate examples from example generator 110. As discussed, in some embodiments, the similar example extractor 112 can receive candidate examples from 108. In an embodiment, the similar example extractor 112 compares the candidate example to the seed example and determines if the two examples are similar. In an embodiment, the similar example extractor 112 can convert both the seed example and candidate example into a vector representation and compare the vector representations. In an embodiment, pairwise comparisons between the vector representations can be performed using cosine similarity, Euclidean distance, Manhattan distance, or other similar mechanisms for computing the similarity of two vector representations. When the similar example extractor 112 determines that the seed and candidate examples are similar, the similar example extractor 112 can output the candidate example (referred to now as a similar example) to the augmented training corpus 114 for use in training, as described above.

Figure 3:
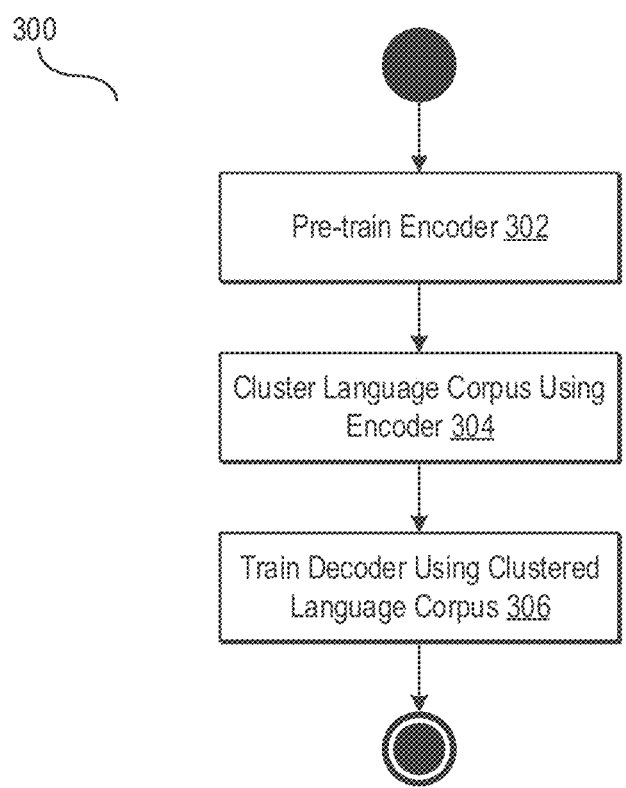
FIG. 3 is a flow diagram illustrating a method for training a language model according to some embodiments.

In the illustrated embodiment, language model 106 and token predictor 108 can both be trained using an offline training process as described in FIG. 3. In an embodiment, the training process can utilize a large document corpus to pre-train the token predictor 108. Then, the document corpus can be clustered to provide training examples for token predictor 108. Details of this process are provided in FIG. 3.

Figure 2:
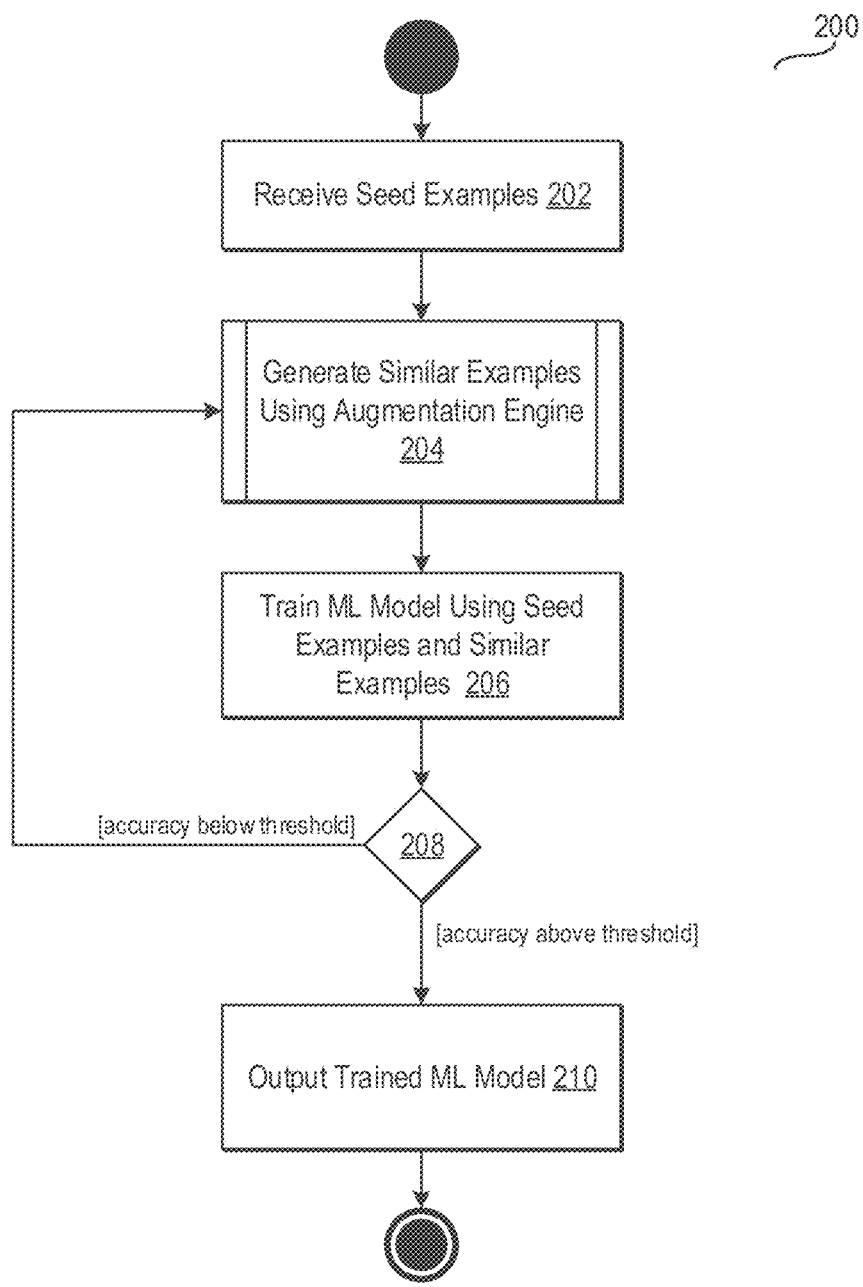
FIG. 2 is a block diagram of a method for training a machine learning model using an augmented training dataset according to some embodiments.

FIG. 2 is a block diagram of a method 200 for training a machine learning model using an augmented training dataset according to some embodiments.

In step 202, a method (200) can comprise receiving seed examples. In an embodiment, the seed examples can comprise text data. In an embodiment, the text data can comprise sentences. In a text-based embodiment, the method (200) is language-agnostic, and the method (200) can operate on data in any language. While the disclosure describes the use of text data, in other embodiments, the method (200) can operate on non-text data (e.g., image, video, audio, etc.). In an embodiment, an annotator can manually label each of the seed examples with a corresponding label. In an embodiment, the label can comprise a numerical label (e.g., a continuous value). In other embodiments, the label can comprise a classification label.

In an embodiment, the method (200) can obtain the seed examples from an external application. For example, the method (200) can receive the seed examples of a chat application, a set of frequently asked questions, or similar data. In such an embodiment, an annotator can manually label the seed examples. However, as will be discussed, the number of seed examples may be small, thus allowing for more limited use of human annotators. In some embodiments, a repository of seed examples, such as a database or similar data storage medium, can store the seed examples.

In step 204, the method (200) can comprise generating similar examples using an augmentation engine. In one embodiment, the method (200) can generate a plurality of similar examples using the augmentation engine. In an embodiment, a similar example refers to an example that is structurally, syntactically, or semantically similar to a given input example (e.g., a seed example). In a text-based context, a similar example can comprise a sentence that is semantically and syntactically similar to a given input seed sentence. In a multimedia (e.g., image, audio, video) context, a similar example can comprise an output (e.g., image, audio, video, respectively) that is structurally similar to a given input seed data. In an embodiment, the method (200) generates similar examples without human intervention and uses an augmentation engine, or set of algorithms, to generate candidate examples and filter the candidate examples to those closely related to the input seed data.

In an embodiment, the augmentation engine used in step 204 can comprise a language model comprising an encoder portion and a decoder portion. In an embodiment, the encoder portion can be configured to convert a given input into a vector representation using an encoder trained as described in FIG. 3. In such an embodiment, the vector representation can be input into a fine-tuned decoder portion trained as described in FIG. 3 as well.

In an embodiment, the method (200) can execute step 204 for each seed example. In some embodiments, the method (200) can execute step (204) multiple times for a given seed example. Thus, the method (200) can generate a set of similar examples for each seed example. Further detail on step 204 is provided in the description of FIG. 4.

In step 206, the method (200) can comprise training an ML model using the seed examples and the similar examples generated in step 204.

In an embodiment, the method (200) can combine the seed examples and similar examples into a single dataset (e.g., an augmented training corpus). In an embodiment, the method (200) can label the similar examples based on the seed example used to generate the similar examples. For example, the method (200) can assign the label of a given seed example to each similar example identified in step 204. In this manner, the method (200) can automatically generate an augmented training dataset.

In an embodiment, the ML model can comprise a logistic regression model, decision tree, random forest, or any other type of ML model. Indeed, the disclosure places no limit on the type of supervised learning approach trained in step 206. Further, in some embodiments, unsupervised learning models can also be used. In such an embodiment, the labels can be ignored during training (e.g., clustering).

In some embodiments, the method (200) can additionally include a preliminary step of training the ML model on the seed examples from step 202. In such embodiment, the method (200) can further comprise testing the ML model to determine the accuracy of the ML model. In one embodiment, the testing can comprise inputting a set of text examples having expected labels and comparing the predicted labels to the expected labels. In one example, the text examples can comprise the seed examples; however, other manually labeled examples can be used.

In step 208, the method (200) can comprise determining if the accuracy of the ML model is above or below a preconfigured threshold. In some embodiments, step 208 can comprise calculating the accuracy of the ML model in predicting labels for a set of text examples, as described previously. Next, the method (200) can compare the current accuracy to a previously computed accuracy. For example, after a first iteration using an augmented training dataset, the method (200) can compare the current accuracy (e.g., using the augmented training dataset to train the model) to the original accuracy (e.g., when using the seed data exclusively as training data).

In some embodiments, the preconfigured threshold can comprise a fixed threshold (e.g., a fixed accuracy percentage). In other embodiments, the preconfigured threshold can comprise a differential threshold (e.g., a required amount of improvement in accuracy). If the preconfigured threshold is not met, the method (200) can retrain the ML model by generating more (or replacement) examples in step 204 and retraining the ML model in step 206.

In step 210, the method (200) outputs the ML model once the accuracy of the retrained model exceeds the preconfigured threshold. In some embodiments, the method (200) can output the ML model by writing the parameters of the ML model to a persistent storage device. In some embodiments, after the method (200) persists the ML model parameters, the ML model can then be used by downstream processes to predict labels for new example data (e.g., sentences).

FIG. 3 is a flow diagram illustrating a method for training a language model according to some embodiments.

In step 302, method (300) comprises pre-training a language encoder using masked input statements.

In one embodiment, the language encoder can comprise an encoder of a transformer-based language model such as an ELECTRA, BERT, RoBERTa, or XLNet model. Other contextual models can be used. In one embodiment, the language encoder can comprise a self-attention layer and a feed-forward neural network when method (300) utilizes a BERT language model. Other encoder architectures can be used.

In some embodiments, the method (300) can pre-train the language encoder using a large language corpus. In such a scenario, a generalized corpus of documents (e.g., Wikipedia® or BOOKCORPUS) can be used to perform pre-training. Sequences (e.g., sentences) in the language corpus can be tokenized and converted into a sequence representation of natural language. For example, the language corpus can be segmented into sentences (based on, for example, English punctuation rules), and then each word in each sentence can be converted to a token that can be processed as outlined below. In some embodiments, additional meta-tokens can be inserted. Examples of meta-tokens include tokens at the beginning and end of a sequence of sentence tokens that define the start and end of sentences.

After obtaining a sequence of tokens, method (300) can mask a portion of the tokens for each sequence. As used herein, masking refers to hiding or removing words or phrases from input sequences.

In some scenarios, a random masking percentage can be used to pre-train the language model. For instance, input examples can be masked. For example, 15% of the input terms can be masked randomly. In other embodiments, however, more complex masking rules can be used to mask terms. In one embodiment, a separate part of speech (POS) tagging process can be applied to the input sentences during pre-training allowing for masking based on grammatical rules. A POS tagging process can tag each term in a sentence with a corresponding part of speech (e.g., noun, verb, adverb, etc.) Various techniques can be used to perform POS tagging, such as a rules-based algorithm, stochastic tagging, Brill tagging, Hidden Markov Model (HMM) tagging, or other similar algorithms. The POS tagging process thus converts each term to a tuple comprising the word and the corresponding POS.

In some embodiments, after tagging, various terms or phrases are masked based on their corresponding parts of speech and corresponding grammatical rules. In one embodiment, a set of POS rules are used to determine whether to mask a portion of a sentence based on grammatical rules. For example, the following five example grammatical rules (but not limited to) can be applied (in a top-down manner) to mask a given input sentence:

TABLE 1

| No. | Grammatical Rule (with Penn Treebank notation) |
|---|---|
| 1 | Adjective→Noun (JJ→NN) |
| 2 | Verb→Noun (VB→NN) |

TABLE 1-continued

| No. | Grammatical Rule (with Penn Treebank notation) |
|---|---|
| 3 | Noun→and→Noun (NN→CC→NN) |
| 4 | Verb→in→Noun (VB→IN→NN) |
| 5 | Verb, noun, adjective (without supporting noun), etc. |

In some embodiments, the grammatical rules can be applied in other words such as a randomly or sequentially and the disclosure is not limited to a top-down application of such grammatical rules.

In some embodiments, the various POS rules can be applied until a preset percentage of terms have been masked. For example, a 15% masking threshold can still be used; however, the grammatical masking rules (versus random masking) can be employed to reach this threshold.

During this pre-training training, sentences can be fed into the language model, and the language model can be tuned such that the predicted output matches the input, and the loss between predictions can be back-propagated to tune the encoder. The sentences used as input can be masked prior to inputting them into the model. Since the model is tuned to output the original input sentence, the model infers the proper words to replace the masked words. Thus, an input sentence "the leaves fall from the tree" can be masked as "the [MASK] fall from the tree," and the model can be trained to predict the term "leaves" to replace the [MASK] value. In some embodiments, a next sentence prediction (NSP) task can be executed in addition to the masked language model (MLM) task described above. However, an NSP task may not be required if using, as an example, a RoBERTa encoder.

In some embodiments, the method (300) can utilize a replaced token detection algorithm in lieu of masking words. In such an embodiment (e.g., using an ELECTRA encoder), a fixed percentage of tokens (e.g., 15%) are not masked but are corrupted by replacing the input tokens with plausible alternatives sampled from a small generator network. Then, instead of training a model that predicts the original identities of the corrupted tokens, the method (300) trains a discriminative model that can predict whether each token in the corrupted input was replaced by a generator sample or not. In some embodiments, the grammatical masking rules described above can be used to identify the tokens to corrupt, and that description is incorporated herein. In another embodiment, instead of masking, a permutation language modeling objective can be utilized to permute the input data (e.g., when using an XLNet model).

While the foregoing examples provide various details regarding specific techniques, other contextual word embedding pre-training techniques may be utilized. In general, any training methodology that generates a model that can convert tokenized inputs to a vectorized representation may be used.

In step 304, method (300) can comprise clustering the language corpus using the pre-trained encoder.

After pre-training, the language corpus can be processed using the encoder of the language model. Specifically, in one embodiment, the encoder layer of the language model can be used, and vectors can be extracted prior to a softmax layer configured to receive the output of the encoder. Specifically, in an embodiment, method (300) can generate vector representations of each sentence or word sequence in the language corpus using the encoder portion of the language model. Next, method (300) can perform pairwise comparisons among each vector to cluster similar sentences. In an embodiment, pairwise comparisons can be performed using cosine similarity, Euclidean distance, Manhattan distance, or other similar mechanisms for computing the similarity of two vectors. In an embodiment, method (300) calculates such a similarity and determines if the similarity is above a threshold. For example, method (300) can use a 90% similarity threshold to determine that two sequences are similar.

Other unsupervised clustering techniques can be used such as k-means clustering or similar algorithms. Finally, after clustering similar sentences, method (300) can fine-tune the pre-trained language model in step 306.

In step 306, method (300) comprises training a candidate example neural network (CENN) to predict candidate sentences given an input sentence. In an embodiment, the input sentences are fed into the language model and converted to a vector representation via the encoder portion of the language model. The vector representation output of the encoder portion is then fed to a decoder (e.g., CENN), the decoder having a training objective of predicting a next (i.e., similar) sentence. In an embodiment, the CENN can comprise a recurrent neural network (RNN) or similar deep learning network.

In one embodiment, for each given sequence, similar sequences clustered in step 304 can be used as labeled training data. In one embodiment, the CENN utilizes a vocabulary table generated by the encoder to generate a probability distribution of next tokens forming a similar sequence (e.g., sentence). A similar sequence can be converted to a vector representation and compared to the original input vector. The difference can be considered the loss and back-propagated to tune the CENN. In one embodiment, the threshold used to cluster sequences (e.g., 90%) can be used as a target similarity of the CENN and used during backpropagation.

In another embodiment, a teacher forcing approach can be used to train the CENN. In this scenario, the clustered sequences can be considered ground truth sequences fed to the CENN. During teacher forcing, a sequence of terms is fed sequentially into the CENN, and the CENN predicts the next word. When the CENN incorrectly predicts the next word, the prediction is discarded, and the error is calculated and used to adjust the hyperparameters of the CENN. Then, the correct word is fed as the next token in the input stream. This process can be repeated for each token. In an alternative embodiment, multiple tokens can be input to the CENN until a special token (e.g., "<GEN>") is encountered. Upon encountering this token, the CENN can then begin predicting the next tokens until an end of sequence ("<EOS>") token is output. Upon outputting the end of sequence token, the similarity between the output and the input are compared, and the error can be backpropagated.

Although the use of RNNs is described, any sequence-to-sequence model including various RNNs can be used to train the candidate example neural network. For example, a long-short term memory (LSTM) network, Open-Source Neural Machine Translation (OpenNMT), or a similar network.

Figure 4:
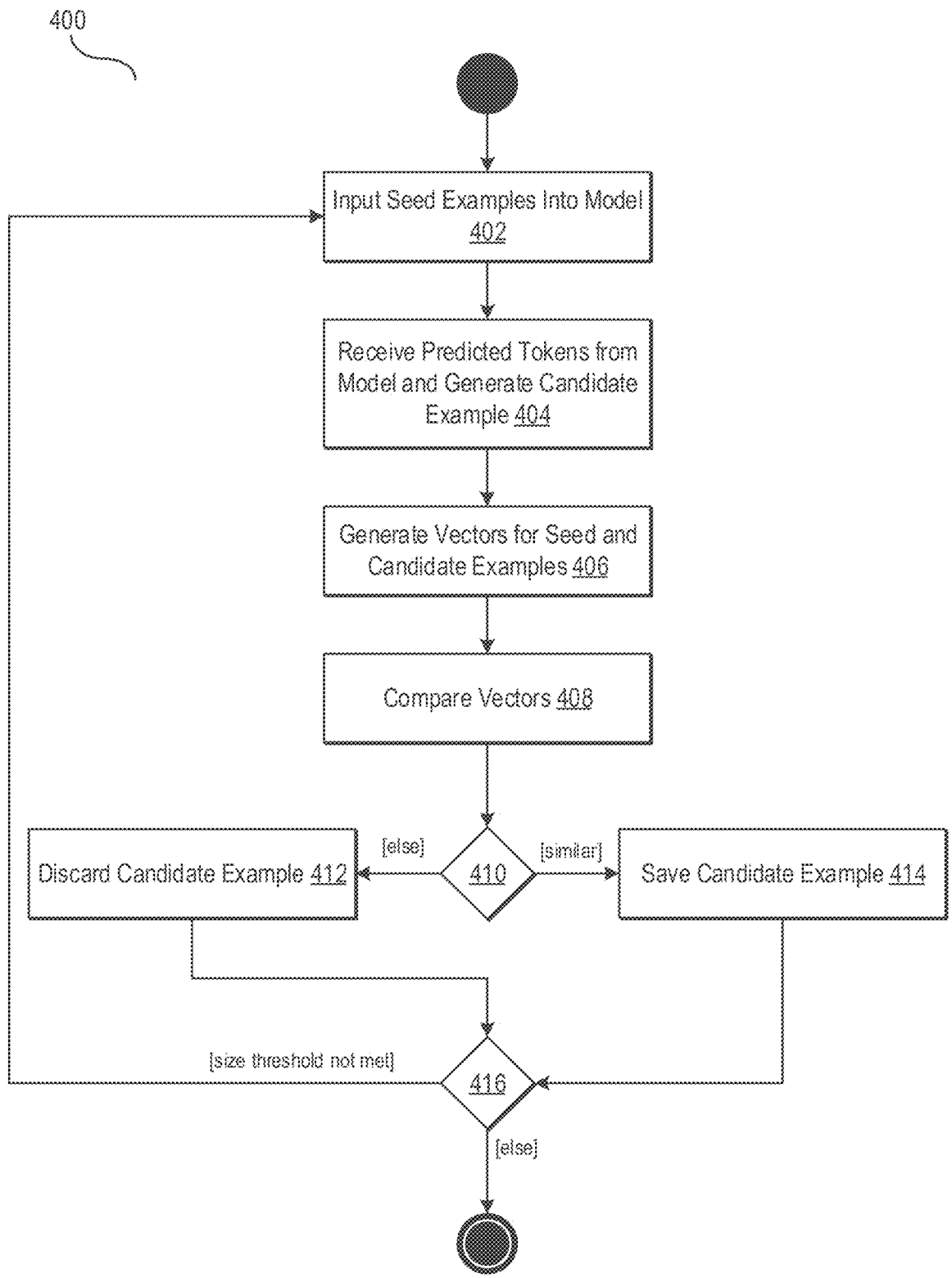
FIG. 4 is a flow diagram illustrating a method for generating similar examples according to some embodiments of the disclosure.

FIG. 4 is a flow diagram illustrating a method for generating similar examples according to some embodiments of the disclosure.

In step 402, the method (400) can comprise inputting seed examples into a language model. In some embodiments, the language model can comprise an encoder and decoder (CENN) network as described in FIG. 3. During production, input seed examples can be input into the model which can output multiple sentences that are similar examples.

In step 404, the method (400) can comprise receiving sequences of tokens predicted by a decoder network (e.g., CENN, such as an RNN). In an embodiment, the decoder network can receive an input sequence of tokens (in some embodiments, vectorized via the encoder) and can output a sequence of tokens. In one embodiment, the decoder network continues to accumulate state until a token that signals to start outputting candidate tokens is detected. Once the method (400) detects such a token, one or more output layers utilize the stored state from previous time steps to output candidate tokens in an ordered sequence. In some embodiments, the decoder can continuously output tokens until an end of sequence (EOS) token is output. After the EOS token is output, the method (400) can use the output tokens as a candidate sequence. In some embodiments, the method (400) concatenates the output tokens to form a candidate example.

In step 406, the method (400) generates vectors for the seed example and the candidate example. In an embodiment, the method (400) can input the seed example and the candidate example into an encoder portion of the language model to obtain corresponding contextualized vectors for both examples. As described previously, the vectors can be obtained by extracting the output of the encoder prior to the application of a softmax function.

In step 408, the method (400) determines the similarity of the vectors. In an embodiment, pairwise comparisons can be performed using cosine similarity, Euclidean distance, Manhattan distance, or other similar mechanisms for computing the similarity of two vectors.

In step 410, the method (400) determines if the similarity exceeds a preconfigured relevance threshold. In one embodiment, the method (400) can utilize a fixed relevance threshold for determining whether or not the candidate example is suitably similar to the input example. For example, the method (400) can determine if the calculated distance is less than a minimum relevance threshold value (i.e., the two vectors are closely situated in a coordinate system). In some embodiments, this relevance threshold value can be tuned to meet the performance needs of the method (400).

In step 412, if the method (400) determines that the similarity between two sequences is not below the preconfigured relevance threshold, the method (400) will discard the candidate sequence. Alternatively, if the method (400) determines that the similarity between two sequences is below the preconfigured relevance threshold, the method (400) will retain the candidate sequence as a candidate training example. In one embodiment, the method (400) can further utilize a label associated with the input example as a label for the candidate example. For example, if the input example included a sentiment label, this sentiment label can be applied to the candidate example, thus increasing the training data size.

In some embodiments, steps 408, 410, and 412 can be optional, and instead, the method (400) can presume that all candidate sentences output by the decoder are suitably sufficient due to the use of distance calculations during training. In such an embodiment, the method (400) can proceed to step 414 immediately after step 406. However, in some embodiments, steps 408, 410, and 412 can allow for greater or less flexibility in similarity determinations given a seed example.

In step 416, the method (400) determines if enough candidate examples were generated. In some embodiments, the method (400) can use a predefined size threshold to determine whether to continue generating candidate examples in steps 402, 404, 406, 408, 410, 412, and 414. If the method (400) determines that enough candidate examples were generated (i.e., the number of candidate examples is equal to the size threshold), the method (400) ends.

Figure 5:
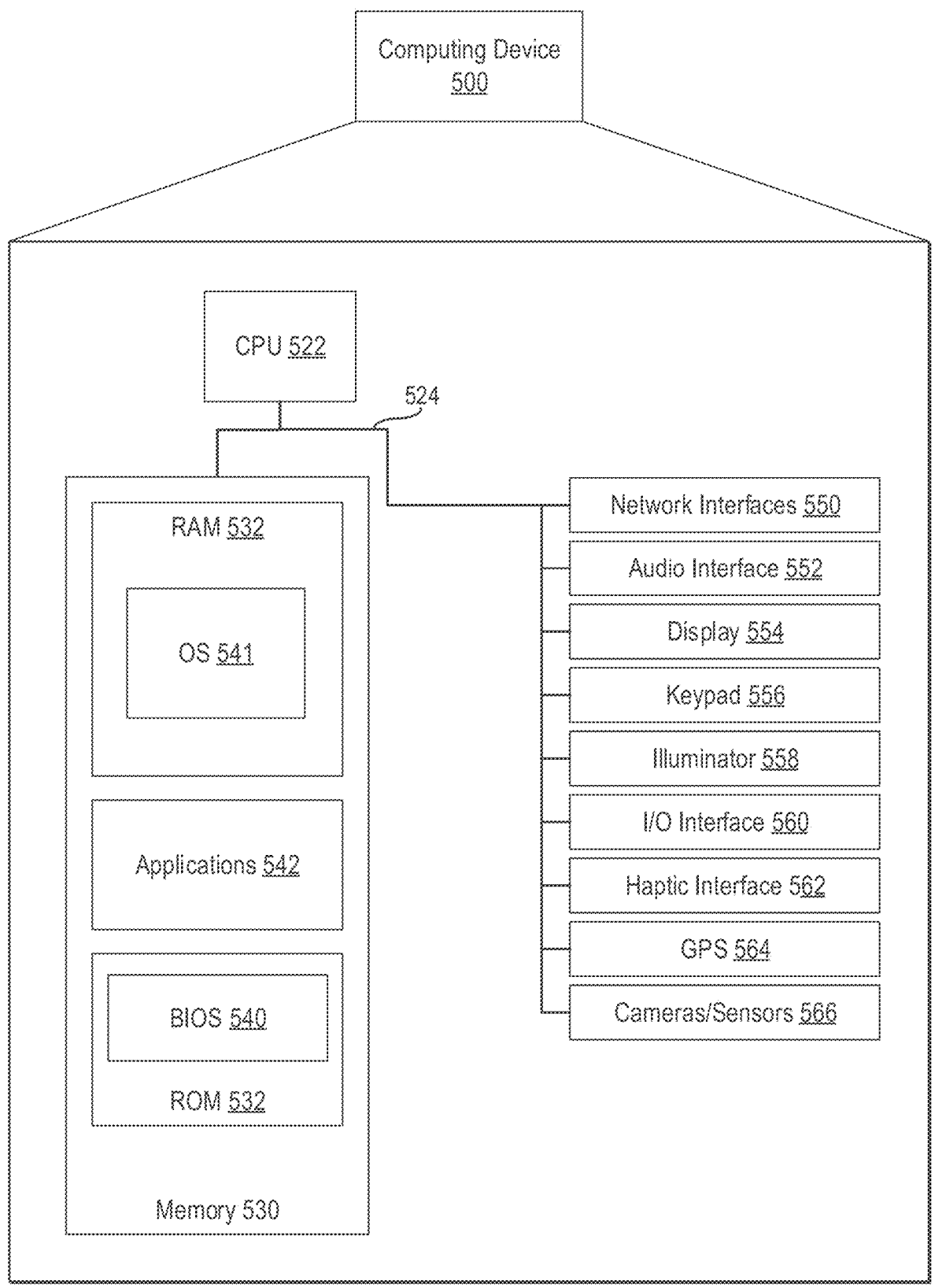
FIG. 5 is a block diagram illustrating a computing device showing an example of a client or server device used in the various embodiments of the disclosure.

FIG. 5 is a block diagram illustrating a computing device showing an example of a client or server device used in the various embodiments of the disclosure.

The computing device 500 may include more or fewer components than those shown in FIG. 5, depending on the deployment or usage of the computing device 500. For example, a server computing device, such as a rack-mounted server, may not include an audio interface 552, display 554, keypad 556, illuminator 558, haptic interface 562, Global Positioning System (GPS) receiver such as GPS receiver 564, or cameras/sensors 566. Some devices may include additional components not shown, such as graphics processing unit (GPU) devices, cryptographic co-processors, artificial intelligence (AI) accelerators, or other peripheral devices.

As shown in the figure, the computing device 500 includes a central processing unit, such as CPU 522, in communication with a mass memory 530 via a bus 524. The computing device 500 also includes a network interface 550, an audio interface 552, a display 554, a keypad 556, an illuminator 558, an input/output interface 560, a haptic interface 562, a GPS receiver 564, and a camera(s) or other optical, thermal, or electromagnetic cameras/sensors 566. The computing device 500 can include a plurality of cameras/sensors 566. The positioning of the cameras/sensors 566 on the computing device 500 can change per computing device 500 model, per computing device 500 capabilities, and the like, or some combination thereof.

In some embodiments, the CPU 522 may comprise a general-purpose CPU. The CPU 522 may comprise a single-core or multiple-core CPU. The CPU 522 may comprise a system-on-a-chip (SoC) or a similar embedded system. In some embodiments, a GPU may be used in place of, or in combination with, a CPU 522. Mass memory 530 may comprise a dynamic random-access memory (DRAM) device, a static random-access memory device (SRAM), or a Flash (e.g., NAND Flash) memory device. In some embodiments, mass memory 530 may comprise a combination of such memory types. In an embodiment, bus 524 may comprise a Peripheral Component Interconnect Express (PCIe) bus. In some embodiments, bus 524 may comprise multiple busses instead of a single bus.

Mass memory 530 illustrates another example of computer storage media for the storage of information such as computer-readable instructions, data structures, program modules, or other data. Mass memory 530 stores a basic input/output system, BIOS 540, for controlling the low-level operation of the computing device 500. The mass memory also stores an operating system 541 for controlling the operation of the computing device 500

Applications 542 may include computer-executable instructions which, when executed by the computing device 500, perform any of the methods (or portions of the methods) described previously in the description of the preceding Figures. In some embodiments, the software or programs implementing the method embodiments can be read from a hard disk drive (not illustrated) and temporarily stored in RAM 532 by CPU 522. CPU 522 may then read the software or data from RAM 532, process them, and store them in RAM 532 again.

The computing device 500 may optionally communicate with a base station (not shown) or directly with another computing device. Network interface 550 is sometimes known as a transceiver, transceiving device, or network interface card (NIC).

The audio interface 552 produces and receives audio signals such as the sound of a human voice. For example, the audio interface 552 may be coupled to a speaker and microphone (not shown) to enable telecommunication with others or generate an audio acknowledgment for some action. Display 554 may be a liquid crystal display (LCD), gas plasma, light-emitting diode (LED), or any other type of display used with a computing device. Display 554 may also include a touch-sensitive screen arranged to receive input from an object such as a stylus or a digit from a human hand.

Keypad 556 may comprise any input device arranged to receive input from a user. Illuminator 558 may provide a status indication or provide light.

The computing device 500 also comprises an input/output interface 560 for communicating with external devices, using communication technologies, such as USB, infrared, Bluetooth™, or the like. The haptic interface 562 provides tactile feedback to a user of the client device.

The GPS receiver 564 can determine the physical coordinates of the computing device 500 on the surface of the Earth, which typically outputs a location as latitude and longitude values. GPS receiver 564 can also employ other geo-positioning mechanisms, including, but not limited to, triangulation, assisted GPS (AGPS), E-OTD, CI, SAI, ETA, BSS, or the like, to further determine the physical location of the computing device 500 on the surface of the Earth. In an embodiment, however, the computing device 500 may communicate through other components, provide other information that may be employed to determine the physical location of the device, including, for example, a MAC address, IP address, or the like.

The present disclosure has been described with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, the reasonably broad scope for claimed or covered subject matter is intended. Among other things, for example, the subject matter may be embodied as methods, devices, components, or systems. Accordingly, embodiments may, for example, take the form of hardware, software, firmware, or any combination thereof (other than software per se). The provided detailed description is, therefore, not intended to be taken in a limiting sense.

Throughout the specification and claims, terms may have nuanced meanings suggested or implied in context beyond an explicitly stated meaning. Likewise, the phrase "in some embodiments" as used herein does not necessarily refer to the same embodiment, and the phrase "in another embodiment" as used herein does not necessarily refer to a different embodiment. It is intended, for example, that claimed subject matter includes combinations of example embodiments in whole or in part.

In general, terminology may be understood at least in part from usage in context. For example, certain conjunctive terms (e.g., "or," "and," "and/or") as used herein may include a variety of meanings that may depend at least in part upon the context in which such terms are used. Typically, "or" if used to associate a list, such as A, B, or C, is intended to mean A, B, and C, here used in the inclusive sense, as well as A, B, or C, here used in the exclusive sense.

In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, can be understood to convey a singular usage or to convey a plural usage, depending at least in part upon context. In addition, the term "based on" may be understood as not necessarily intended to convey an exclusive set of factors and may, instead, allow for the existence of additional factors not necessarily expressly described, again, depending at least in part on context.

The present disclosure has been described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur in different orders than illustrated. For example, two blocks shown in succession can, in fact, be executed substantially concurrently, or the blocks can sometimes be executed in the reverse order, depending upon the functionality/acts involved.

For the purposes of this disclosure, a non-transitory computer-readable medium (or computer-readable storage medium/media) stores computer data, which data can include computer program code (or computer-executable instructions) that is executable by a computer, in machine-readable form. By way of example, and not limitation, a computer-readable medium may comprise computer-readable storage media for tangible or fixed storage of data or communication media for transient interpretation of code-containing signals. Computer-readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer-readable storage media includes, but is not limited to, RAM, ROM, EPROM, EEPROM, flash memory or other solid-state memory technology, CD-ROM, DVD, or other optical storage, cloud storage, magnetic cassettes, magnetic tape, magnetic disk storage, or other magnetic storage devices, or any other physical or material medium which can be used to tangibly store the desired information or data or instructions and which can be accessed by a computer or processor.

In the preceding specification, various example embodiments have been described with reference to the accompanying drawings. However, it will be evident that various modifications and changes may be made thereto, and additional embodiments may be implemented without departing from the broader scope of the disclosed embodiments as set forth in the claims that follow. The specification and drawings are accordingly to be regarded in an illustrative rather than restrictive sense.

We claim:

1. A method comprising:
   receiving a seed example, the seed example stored in a seed training data set;
   encoding the seed example using a pre-trained encoder trained using a masked language model (MLM) training objective, the encoder outputting an encoded seed example as a vector representation;
   inputting the encoded seed example into a recurrent neural network (RNN), the RNN configured to generate a candidate example, the candidate example comprising a new example;
   determining that the candidate examples is similar to the encoded seed example by: generating a vector representation of the candidate example using the pre-trained encoder used to encode the seed example, computing a similarity score between the vector representation of the candidate example and the encoded seed example using at least one of cosine similarity or Euclidean distance in a single vector space; and determining the similarity score exceeds a configured threshold; and
   augmenting the seed training data set with the candidate example, wherein the augmented seed training data set is used to train a machine learning model to improve prediction accuracy.

2. The method of claim 1, wherein receiving a seed example comprises receiving a sentence comprising a plurality of words.

3. The method of claim 1, wherein the encoder comprises one or more of a BERT (Bidirectional Encoder Representations from Transformers), ROBERTA (Robustly optimized BERT approach), ELECTRA (Efficiently Learning an Encoder that Classifies Token Replacements Accurately), or XLNet (Extra Long Net) encoder.

4. The method of claim 1, wherein the MLM training objective comprises masking a subset of input tokens based on at least one grammatical rule.

5. The method of claim 1, wherein the method further comprises:
   training the RNN by clustering a data corpus based on encoded seed examples generated by the encoder;
   inserting a training example from the data corpus into the RNN and receiving a predicted candidate example; and
   computing a loss between the predicted candidate example and the training example, and back-propagating an error to the RNN based on the loss.

6. The method of claim 1, further comprising:
   masking a portion of the seed example based on grammatical rules prior to encoding;
   providing the masked seed example to the encoder; and
   training the encoder to predict the masked portions, wherein the training improves semantic understanding of the encoder.

7. The method of claim 1, wherein augmenting the seed training data set comprises:
   storing the candidate example with a same label as the seed example;
   retraining the machine learning model using both the seed example and candidate example; and
   validating that the retrained machine learning model maintains or improves accuracy compared to training with the seed example alone.

8. A non-transitory computer-readable storage medium for tangibly storing computer program instructions capable of being executed by a computer processor, the computer program instructions defining steps of:

receiving a seed example, the seed example stored in a seed training data set;

encoding the seed example using a pre-trained encoder trained using a masked language model (MLM) training objective, the encoder outputting an encoded seed example as a vector representation;

inputting the encoded seed example into a recurrent neural network (RNN), the RNN configured to generate a candidate example, the candidate example comprising a new example;

determining that the candidate example is similar to the encoded seed example by: generating a vector representation of the candidate example using the pre-trained encoder used to encode the seed example, computing a similarity score between the vector representation of the candidate example and the encoded seed example using at least one of cosine similarity or Euclidean distance in a single vector space; and determining the similarity score exceeds a configured threshold; and augmenting the seed training data set with the candidate example, wherein the augmented seed training data set is used to train a machine learning model to improve prediction accuracy.

9. The non-transitory computer-readable storage medium of claim 8, wherein receiving a seed example comprises receiving a sentence comprising a plurality of words.

10. The non-transitory computer-readable storage medium of claim 8, wherein the encoder comprises one or more of a BERT (Bidirectional Encoder Representations from Transformers), ROBERTA (Robustly optimized BERT approach), ELECTRA (Efficiently Learning an Encoder that Classifies Token Replacements Accurately), or XLNet (Extra Long Net) encoder.

11. The non-transitory computer-readable storage medium of claim 8, wherein the MLM training objective comprises masking a subset of input tokens based on at least one grammatical rule.

12. The non-transitory computer-readable storage medium of claim 8, wherein the steps further comprise:

training the RNN by clustering a data corpus based on encoded seed examples generated by the encoder;

inserting a training example from the data corpus into the RNN and receiving a predicted candidate example;

computing a loss between the predicted candidate example and the training example; and backpropagating an error to the RNN based on the loss.

13. A device comprising:

a processor configured to:

receive a seed example, the seed example stored in a seed training data set;

encode the seed example using a pre-trained encoder trained using a masked language model (MLM) training objective, the encoder outputting an encoded seed example as a vector representation;

input the encoded seed example into a recurrent neural network (RNN), the RNN configured to generate a candidate example, the candidate example comprising a new example;

determine that the candidate example is similar to the encoded seed example by: generating a vector representation of the candidate example using the pre-trained encoder used to encode the seed example, computing a similarity score between the vector representation of the candidate example and the encoded seed example using at least one of cosine similarity or Euclidean distance in a single vector space; and determining the similarity score exceeds a configured threshold; and augment the seed training data set with the candidate example, wherein the augmented seed training data set is used to train a machine learning model to improve prediction accuracy.

14. The device of claim 13, wherein receiving a seed example comprises receiving a sentence comprising a plurality of words.

15. The device of claim 13, wherein the MLM training objective comprises masking a subset of input tokens based on at least one grammatical rule.

16. The device of claim 13, wherein the processor is further configured to:

train the RNN by clustering a data corpus based on encoded seed examples generated by the encoder;

insert a training example from the data corpus into the RNN and receiving a predicted candidate example;

compute a loss between the predicted candidate example and the training example; and backpropagate an error to the RNN based on the loss.

* * * * *